United States Patent
Goto et al.

(10) Patent No.: US 9,047,772 B2
(45) Date of Patent: Jun. 2, 2015

(54) ON-VEHICLE DEVICE AND ADVERTISEMENT INFORMATION DISTRIBUTION SYSTEM

(75) Inventors: Souju Goto, Yokohama (JP); Hideyuki Nagatomo, Kawasaki (JP)

(73) Assignee: JVC Kenwood Corporation, Yokohama-shi, Kanagawa (JP)

( * ) Notice: Subject to any disclaimer, the term of this patent is extended or adjusted under 35 U.S.C. 154(b) by 776 days.

(21) Appl. No.: 12/597,568

(22) PCT Filed: Apr. 25, 2008

(86) PCT No.: PCT/JP2008/058053
§ 371 (c)(1),
(2), (4) Date: Oct. 26, 2009

(87) PCT Pub. No.: WO2008/139889
PCT Pub. Date: Nov. 20, 2008

(65) Prior Publication Data
US 2010/0121703 A1  May 13, 2010

(30) Foreign Application Priority Data
Apr. 27, 2007  (JP) ................... 2007-119218

(51) Int. Cl.
| | |
|---|---|
| G06Q 30/00 | (2012.01) |
| G08G 1/0967 | (2006.01) |
| G01C 21/26 | (2006.01) |
| G06Q 30/02 | (2012.01) |

(Continued)

(52) U.S. Cl.
CPC .......... *G08G 1/096716* (2013.01); *G01C 21/26* (2013.01); *G06Q 30/02* (2013.01); *G06Q 30/0242* (2013.01); *G07B 15/063* (2013.01); *G08G 1/0962* (2013.01); *G08G 1/09675* (2013.01); *G08G 1/096775* (2013.01); *G09F 21/04* (2013.01)

(58) Field of Classification Search
None
See application file for complete search history.

(56) References Cited

U.S. PATENT DOCUMENTS

| | | | | |
|---|---|---|---|---|
| 4,720,873 | A * | 1/1988 | Goodman et al. | 725/32 |
| 2002/0072848 | A1 | 6/2002 | Hamada et al. | |

(Continued)

FOREIGN PATENT DOCUMENTS

| | | |
|---|---|---|
| JP | 2001-343249 | 12/2001 |
| JP | 2002-131065 | 5/2002 |

(Continued)

OTHER PUBLICATIONS

International Search Report for PCT/JP2008/058053.
(Continued)

*Primary Examiner* — Matthew T Sittner
(74) *Attorney, Agent, or Firm* — Eric J. Robinson; Robinson Intellectual Property Law Office, P.C.

(57) ABSTRACT

Provided is an on-vehicle device which can build a charge system which can charge in accordance with use of advertisement information. The on-vehicle device stores uplink information including some or all of information indicating whether the advertisement information is received, information indicating whether the received advertisement information is displayed, and information indicating whether a vehicle (C) has stopped before reaching an advertisement object point indicated by the advertisement information. Each of the information is made to be a charging object for advertisement.

6 Claims, 7 Drawing Sheets

(51) Int. Cl.
*G07B 15/06* (2011.01)
*G08G 1/0962* (2006.01)
*G09F 21/04* (2006.01)

(56) References Cited

U.S. PATENT DOCUMENTS

| | | | |
|---|---|---|---|
| 2003/0144906 A1* | 7/2003 | Fujimoto et al. | 705/14 |
| 2004/0044572 A1* | 3/2004 | Kawamata et al. | 705/14 |
| 2004/0215568 A1* | 10/2004 | Fukushima et al. | 705/51 |
| 2005/0041641 A1* | 2/2005 | Cooley | 370/352 |
| 2005/0250515 A1* | 11/2005 | Oka | 455/456.1 |
| 2005/0273385 A1* | 12/2005 | Vandervoort | 705/14 |
| 2006/0240808 A1* | 10/2006 | Crolley | 455/414.1 |
| 2007/0061057 A1 | 3/2007 | Huang et al. | |
| 2008/0125155 A1* | 5/2008 | Saito | 455/510 |
| 2009/0299857 A1* | 12/2009 | Brubaker | 705/14.66 |
| 2010/0041388 A1* | 2/2010 | Kawasaki | 455/422.1 |
| 2010/0088181 A1* | 4/2010 | Crolley et al. | 705/14.63 |

FOREIGN PATENT DOCUMENTS

| | | |
|---|---|---|
| JP | 2002-181563 | 6/2002 |
| JP | 2002-267458 | 9/2002 |
| JP | 2003-216539 | 7/2003 |
| JP | 2004-104270 | 4/2004 |
| JP | 2004-220299 | 8/2004 |
| JP | 2005-025461 | 1/2005 |
| JP | 2005-228173 | 8/2005 |
| JP | 2006-202199 | 8/2006 |
| JP | 1 760 654 | 3/2007 |
| JP | 2007-068164 | 3/2007 |

OTHER PUBLICATIONS

International Preliminary Report on Patentability (Application No. PCT/JP2008/058053) dated Dec. 3, 2009.

Japanese Office Action (Application No. 2009-514082) dated Nov. 21, 2011.

Supplementary European Search Report (PCT/JP2008058053) dated Jul. 19, 2012.

Office Action (JP 2009-514082) dated Jul. 31, 2012.

* cited by examiner

ON-VEHICLE DEVICE AND ADVERTISEMENT INFORMATION DISTRIBUTION SYSTEM

TECHNICAL FIELD

The present invention relates to an on-vehicle device and an advertisement information distribution system using a navigation apparatus.

BACKGROUND ART

Nowadays, car navigation systems have an ITS (Intelligent Transport System) on-vehicle device which includes a navigation apparatus mounted on a vehicle and provide many kinds of services such as the ETC (Electronic Toll Collection system) and the VICS (Vehicle Information and Communication System).

Recently, there have been attempts to provide various services by adopting a wireless communication protocol called a DSRC (Dedicated Short-Range Communication) system. In order to provide such services, a roadside radio device and a center apparatus both of which are capable of the DSRC connection must be capable of communicating with each other over a network. The roadside radio device is disposed at a predetermined point and communicates with the navigation apparatus over the DSRC connection. The center apparatus, in turn, sends information stored therein for use in providing services, to the roadside radio device if required.

With the DSRC, community-based advertisement information can be displayed on the screen of the navigation apparatus in real time as well as the above-mentioned ETC and VICS. The community-based advertisement information includes information on various facilities such as restaurants, parking lots, and the like around the vehicle. With such an advertisement distribution service using the DSRC, the user can watch only necessary advertisement information on the area around the vehicle on the screen of the navigation apparatus (see Patent Document 1, and Patent Document 2).

Patent Document 1: Japanese Patent Application Laid-Open No. 2001-101578
Patent Document 2: Japanese Patent Application Laid-Open No. 2004-279509

DISCLOSURE OF THE INVENTION

Problems to be Solved by the Invention

With the above-mentioned advertisement distribution systems, however, it is actually unknown whether the user has visited the various facilities according to the advertisement information. It is also basically unknown to the advertiser who asked to distribute the advertisement whether the user watches the advertisement information distributed to the navigation apparatus. Since some types and models of navigation apparatus cannot display the advertisement information, an expected amount of advertisement information is not necessarily distributed unlike the television and radio. Therefore, the advertiser cannot be assured that advertisement information worth the paid advertising rates is distributed even if the advertiser has paid definite advertising rates uniformly to the advertisement distributers.

It is difficult for the advertiser to clearly determine the cost and effect (cost-effectiveness) of advertisement distribution, and the advertiser may spend unnecessary advertising rates. The advertiser intends to have the users watch the advertisement at least worth the advertising rates the advertiser has paid. On the other hand, the advertisement distributer intends to have requests from many advertisers by offering low advertising rates, while making a profit by trying to differentiate their service from that of other traders.

As such, it is desired to clarify the contract of advertising rates so that the advertisement information is distributed for the rates which the both sides take to be appropriate.

The technical problem to be solved by the invention is to provide an on-vehicle device which can build a charge system which can charge in accordance with use of advertisement information.

Means for Solving the Problems

The on-vehicle device according to the present invention basically includes: a communication means for communicating with a center apparatus which distributes advertisement information via a roadside radio device; a display means; and a control means for generating send information including some or all of information indicating whether the advertisement information is received from the center apparatus, information indicating whether the received advertisement information is displayed by the display means, and information indicating whether a vehicle has reached a point indicated by the displayed advertisement information and causing the communication means to send the generated send information to the center apparatus.

Preferably, the on-vehicle device according to the present invention has a storage means including a storage region for storing the send information, wherein the control means operates to store the generated send information in the storage region and to cause the communication means to send the send information stored in the storage region to the center apparatus.

Preferably, the control means operates to generate identification information for identifying the advertisement distributer which distributes the advertisement information and to cause the generated identification information to be included in the send information.

The control means may be adapted to operate to generate information on traveling of the vehicle and to cause the generated information to be included in the send information.

Further, the on-vehicle device according to the present invention may include an input means for inputting contents of advertisement information which is desired to be received, wherein the control means may be adapted to operate to generate information on the desired advertisement information which is input through the input means and to cause the generated information to be included in the send information.

Further, the control means may be adapted to operate to determine whether the advertisement information sent from the center apparatus is advertisement information based on the send information, and if the advertisement information is the advertisement information based on the send information, to permit to receive the advertisement information and to cause the communication means to receive the advertisement information or to cause the display means to display the advertisement information.

Further, the control means may be adapted to operate to store the received advertisement information in the storage means for each category based on the send information and to cause the display means to display the stored advertisement information for each category.

The present invention can be understood as an advertisement information distribution system in another aspect. An object of the advertisement information distribution system according to the present invention is to enable advertising rates to be charged in accordance with use of advertisement information by a user, and the system basically includes a center apparatus for providing advertisement information; a roadside radio device for communicating with the center apparatus; and an on-vehicle device for receiving the advertisement information via the roadside radio device. The on-vehicle device is adapted to operate to generate send information including at least one or all of information indicating whether the advertisement information is received from the center apparatus, information indicating whether the received advertisement information is displayed, and information indicating whether a vehicle has reached a point indicated by the displayed advertisement information, to operate to send the generated send information to the center apparatus, and also to operate to cause the center apparatus to accumulate the send information received from the on-vehicle device so that the advertising rates are charged on the basis of the accumulated send information.

Advantage of the Invention

According to the present invention, an on-vehicle device can store each of information indicating whether advertisement information is received, information indicating whether the advertisement information is displayed on a screen, and information indicating whether the vehicle has stopped at an advertisement object point. The on-vehicle device can build an advertisement distribution system which charges advertising rates based on the respective types of information by generating the respective types of information as history information. According to the information indicating that the advertisement information is displayed, the user can be presumed to have watched that, and according to the information indicating that the vehicle has stopped at the point, the user can be presumed to have visited the place shown in the advertisement information, respectively.

Accordingly, when the advertiser requests the advertisement distributer to distribute the advertisement information, the advertiser can have the advertisement information to be distributed at appropriate rates.

DESCRIPTION OF SYMBOLS

Figure 1:
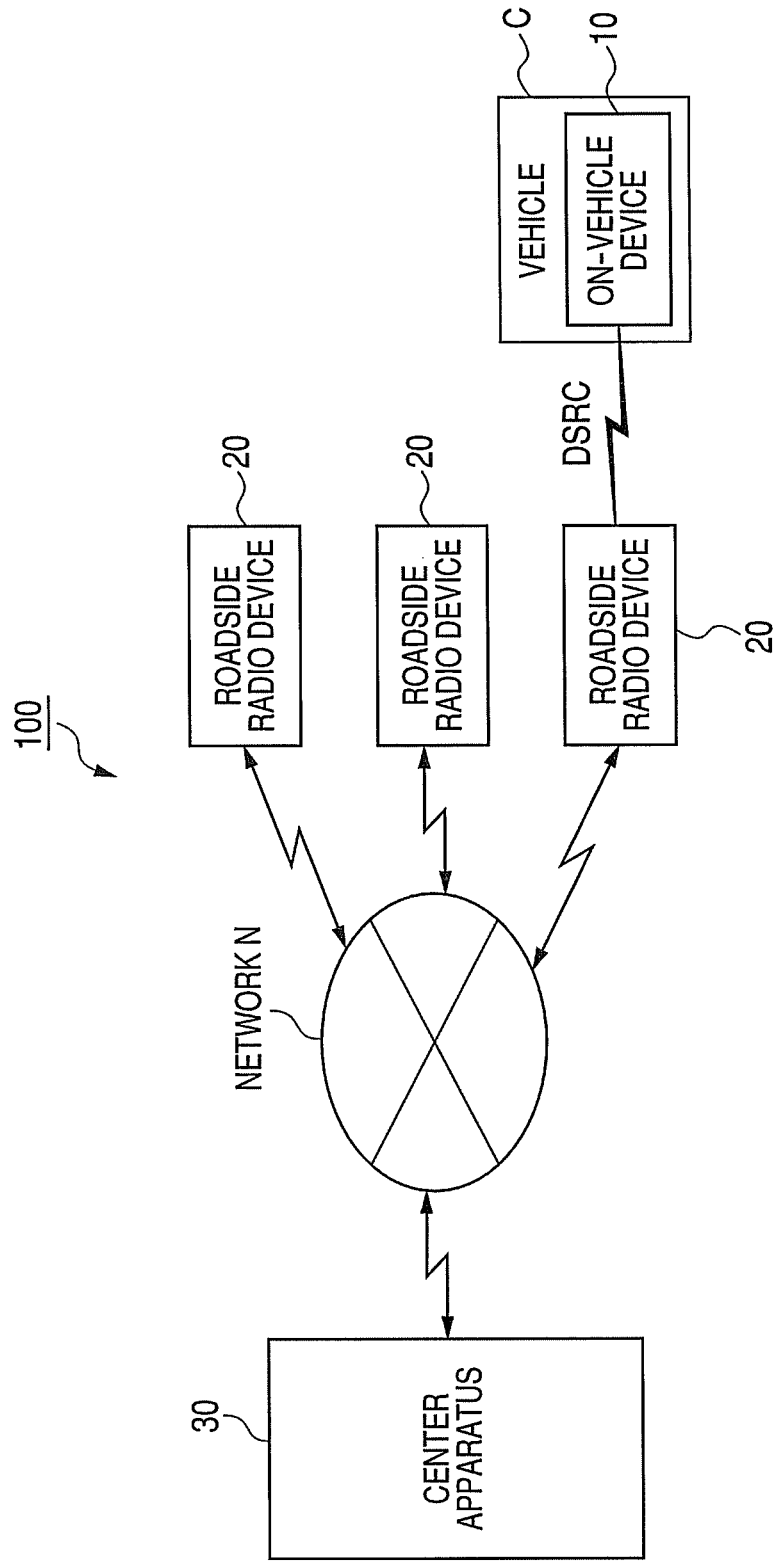
FIG. 1 is an entire schematic diagram illustrating an example of an advertisement distribution system.

100 advertisement distribution system
10 on-vehicle device
20 roadside radio device
30 center apparatus
11 car navigation unit
12 VICS module
13 DSRC unit
14 control unit
C vehicle Best Modes for Carrying Out the Invention The configuration and operation of the most preferable embodiment of the on-vehicle device according to the present invention will be described in detail with reference to the drawings below.

First, the general view of an advertisement distribution system 100 in the embodiment is shown in FIG. 1. The advertisement distribution system 100 includes an on-vehicle device 10, a roadside radio device 20, and a center apparatus 30.

The on-vehicle device 10 is an on-vehicle device including a car navigation unit and a DSRC unit (see FIG. 3) and installed at a predetermined position in a vehicle C. The car navigation unit can obtain such services as VICS mainly through three media. The three media are the FM multiplex broadcasting, the optical beacon, and the radio beacon. The on-vehicle device 10 obtains the services by unidirectionally receiving various types of information through any of the media up to the present. On the other hand, the DSRC unit can accept 5.8 GHz band active system interactive communication, and so it can be used for ETC, for example.

The roadside radio device 20 performs 5.8 GHz band interactive communication with the DSRC unit of the on-vehicle device 10. By limiting the communication range to several meters to several tens of meters to make the cell radius smaller, the roadside radio device 20 is ensured of communication with each one of the on-vehicle devices 10. That can prevent a charging error in such a case in which the roadside radio device 20 catches the radio wave from the DSRC unit of a vehicle other than one passing through the tollgate of an expressway, for example. Since the same 5.8 GHz band is used in each of the small sections, the frequency resources can be effectively used. The services based on the community where the user is present such as the local information and weather information can also be provided.

The center apparatus 30 stores information to be provided for the on-vehicle device 10. The center apparatus 30 is connected to the roadside radio device 20 via a network N. When the on-vehicle device 10 and the roadside radio device 20 start interactive communication by using the DSRC, the center apparatus receives a notification of the connection start from the roadside radio device 20, and sends necessary information requested by the on-vehicle device 10 to the roadside radio device 20. The information sent by the center apparatus 30 is to be received by the on-vehicle device 10.

Figure 2:
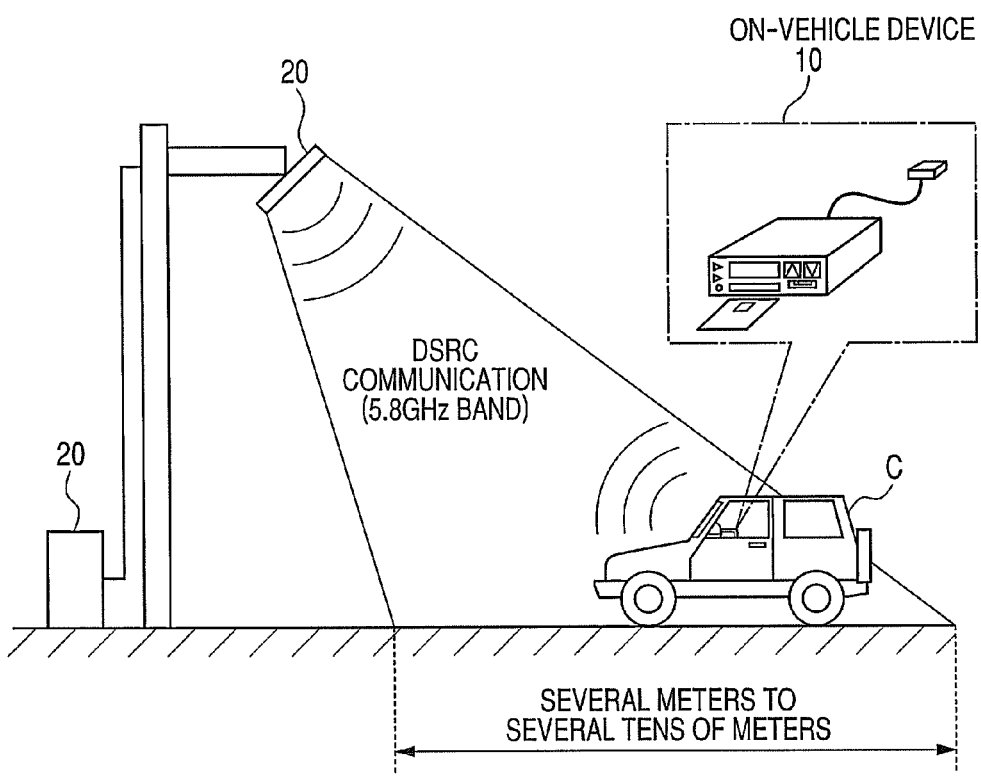
FIG. 2 is a diagram illustrating an example of a basic configuration of a DSRC communication.

FIG. 2 illustrates an example of a basic configuration of a DSRC communication between the on-vehicle device 10 and the roadside radio device 20.

The vehicle C is assumed to be travelling at a slow speed or stop with the on-vehicle device 10. When the vehicle C is in an area where communication with the roadside radio device 20 is available, the roadside radio device 20 interactively starts radio communication with the on-vehicle device 10. The communication available area is a region with the cell radius around several meters to several dozen meters, as mentioned above.

Figure 3:
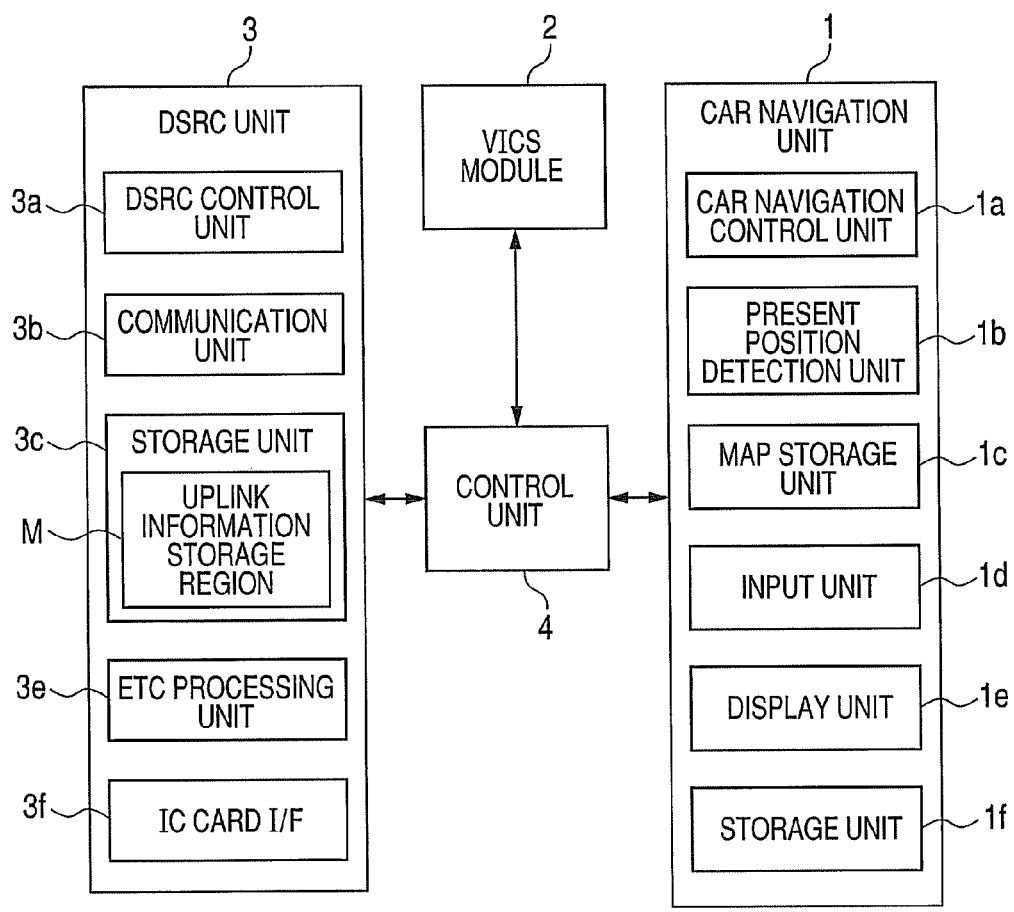
FIG. 3 is a functional block diagram of an on-vehicle device.

FIG. 3 shows a functional block diagram of the on-vehicle device 10.

The on-vehicle device 10 roughly includes a car navigation unit 1, a VICS module 2, a DSRC unit 3, and a control unit 4. In general, they may also be collectively called an ITS on-vehicle device.

The car navigation unit 1 mainly includes a car navigation control unit 1a, a present position detection unit 1b, a map storage unit 1c, an input unit 1d, a display unit 1e, and a storage unit 1f.

The car navigation control unit 1a receives the present position of the vehicle C output from the present position detection unit 1b. Then, the car navigation control unit 1a performs matching with road shapes in map data output from the map storage unit 1c, and causes the display unit 1e to display the map screen and the present vehicle position mark. The car navigation control unit 1a also causes the vehicle position mark on the map and guides the route to the destination set by the user.

The input unit 1d has hard key buttons including various keys for input specifications in the navigation operation and the like, keys for specifying to switch the audio menu displays, and the like, and outputs operation signals according to the operations on the keys to the car navigation control unit 1a.

The display unit 1e includes a monitor and/or a touch panel. The display unit 1e is made of an LCD (Liquid Crystal Display) or the like, and performs a displaying process in accordance with display signals input from the car navigation control unit 1a.

The storage unit 1f includes a recording medium which has programs, data, and the like stored thereon in advance. The storage unit if stores various control programs to be executed by the car navigation control unit 1a, data to be used in executing the control programs, and the like on the recording medium.

The VICS module 2 includes a module which mainly has three VICS functions to receive traffic jam information and emergency information. The three VICS functions are the optical beacon using optical communications, the FM multiplex broadcasting using FM communications, and the radio beacon using radio communications.

The optical beacon receives a service for providing information on an ordinary road by means of infrared. Since the optical beacon has the maximum communication range as short as around 3.5 m, it can receive information for each lane. It can be also used for interactive communication. The optical beacon is under the control of the National Police Agency.

The FM multiplex broadcasting can be received anywhere in the area where the radio wave from the local NHK-FM radio station can be received.

The radio beacon receives a service for providing information mainly on an expressway by means of the 2.4 GHz band radio wave. The radio beacon has the maximum communication range around 70 m, and the data transfer rate is as low as 64 k bit/second. The frequency band for the radio beacon is planned to be changed from 2.4 GHz band to 5.8 GHz band from 2007 to unify the frequency band with the DSRC. If the DSRC is used, the data transfer rate is increased to 4 M bit/second and interactive communication also becomes available.

The DSRC unit 3 includes a DSRC control unit 3a, a communication unit 3b, a storage unit 3c, an ETC processing unit 3e, and an IC card I/F unit 3f.

The DSRC control unit 3a executes general control in cooperation with various control programs stored in the storage unit 3c, i.e., control programs for controlling respective units in the DSRC unit 3, communication control, and the like. Also, the DSRC control unit 3a causes the storage unit 3c to store the send information to be described later (hereinafter referred to as uplink information). Then, the DSRC control unit 3a sends the uplink information to the roadside radio device 20 via the communication unit 3b.

The communication unit 3b includes an antenna unit (not shown) to receive RF (Radiology Frequency) signals in the frequency 5.8 GHz band. Then, it demodulates the received RF signals and sends them to the DSRC control unit 3a. Conversely, it receives the data sent from the DSRC control unit 3a and sends it out via the antenna unit. The sent out data is to be sent to the roadside radio device 20.

The storage unit 3c includes a recording medium which has programs, data, and the like stored thereon in advance. The storage unit 3c stores various control programs to be executed by the DSRC control unit 3a, data to be used in executing the control programs, and the like.

The storage unit 3c also includes an uplink information storage region M.

Figure 4:
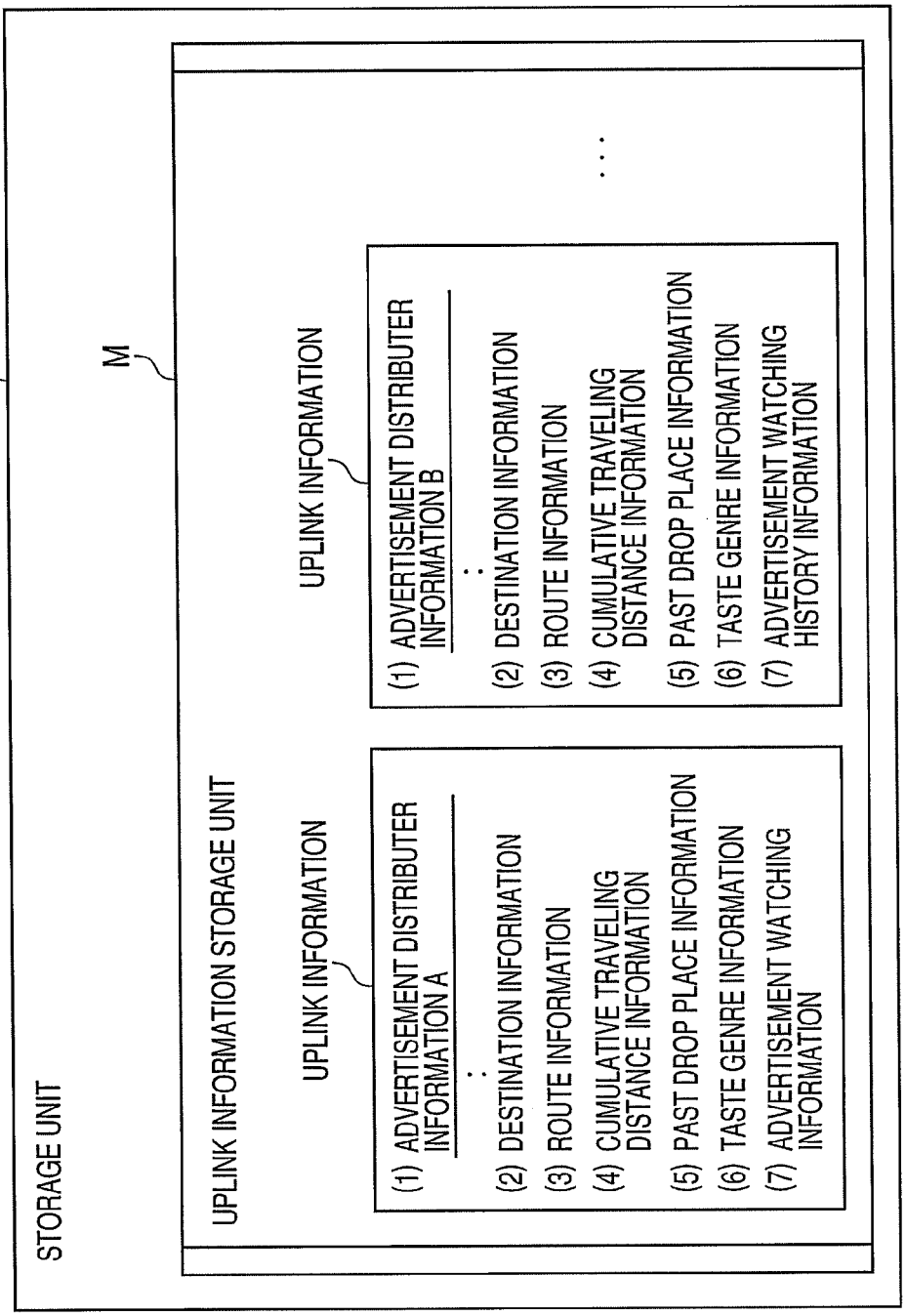
FIG. 4 is a diagram illustrating an example of a data structure of uplink information.

Now, the uplink information which is stored in the uplink information storage region M will be described with reference to FIG. 4.

In the uplink information storage region M, various types of information such as (1) advertisement distributers information, (2) destination information, (3) route information, (4) cumulative traveling distance information, (5) past drop place information, (6) taste genre information, and (7) advertisement watching information are stored. Although the control unit 4 is assumed to generate those types of information as the uplink information and store them in the uplink information storage region M in the description below, it is not applied only to the control unit 4 but the units of the car navigation control unit 1a and the DSRC control unit 3a may be adapted to store the information in the uplink information storage region M, respectively.

The information stored in the uplink information storage region M is sent to the center apparatus 30. The advertisement distributer is to provide the advertisement distribution service to the advertiser and user on the basis of the uplink information. As it will be described later, the uplink information enables the user to watch only the necessary information and the advertiser to distribute the advertisement information to the user for the appropriate advertising rates.

The respective types of information which form the uplink information will be described below. The respective information to be described below may also be set by the user with respect to whether the information is to be generated and stored as the uplink information via the input unit 1d.

(1) The advertisement distributers information is the identification information for identifying the advertisement distributer which is providing the advertisement distribution service. If the user contracts with a plurality of advertisement distributers, the types of uplink information (2) to (7) to be described later are stored in the uplink information storage region M for each advertisement distributers information. In FIG. 4, the types of uplink information (2) to (7) are stored for each of the advertisement distributer A and the advertisement distributer B.

(2) The destination information is the latitude and longitude information of the destination which is set in the car navigation unit 1, which is the information on the traveling of the vehicle C.

(3) The route information is the latitude and longitude information of the points set in the car navigation unit 1, up to five points, for example. This is also the information on the traveling of the vehicle C as the information (2).

The user can watch the advertisement information which is distributed on the basis of the information (2) and (3). Accordingly, the user can watch the advertisement information on the area around the destination as well as the areas around the points on the route to the destination.

(4) The cumulative traveling distance information is the information on the cumulative traveling distance of the vehicle C which has the on-vehicle device 10 mounted.

The control unit 4 stores the cumulative traveling distance stored in the car navigation unit 1 as the uplink information. Accordingly, the user can watch information on gas stations, for example. If the information (4) is combined with the types of information (2) and (3) so that the user can watch the advertisement information which is distributed on the basis of the combined information, the user can watch information on gas stations near the destination and those near the points on the route to the destination.

(5) The past drop place information is information on the latitude, longitude, and the hour and time with respect to the vehicle C when the on-vehicle device is turned off power which has been stored for up to 128 points, for example. If the past drop place information has been stored for more than 128 points before the DSRC control unit 3a sends the uplink information to the roadside radio device 20, the past drop place information is overwritten from the oldest one. After sent to the roadside radio device 20, the past drop place information is reset. The timing on which the DSRC control unit 3a writes the past drop place information into the storage unit 3c as the uplink information is not only applied to the time immediately before the on-vehicle device 10 is turned off power, but may be the time immediately after the on-vehicle device 10 is turned on power. The information is to be stored in the uplink information storage region M as the information on the traveling of the vehicle C. The information is partly used as (7) the advertisement watching information to be described later.

(6) The taste genre information is the information which the user can input via the input unit 1d with respect to the user's favorite genre, which means the information on the desired advertisement information. The control unit 4 stores the input taste genre information in the uplink information storage region M. Then, the control unit 4 controls not to permit to receive the advertisement information other than the taste genre information among the advertisement information which is sent from the roadside radio device 20.

Accordingly, the user does not need to watch unwanted advertisement information, while the advertisement distributer can distribute the advertisement information needed by each user.

(7) The advertisement watching information is the information stored with respect to the information indicating whether the distributed advertisement information is received, the information indicating whether the received advertisement information is displayed on the display unit 1e, and the information indicating whether the user has stopped the vehicle C at a place shown in the advertisement information on the basis of the displayed advertisement information. The information indicating whether the advertisement information is received and the information indicating whether the advertisement information is displayed include the information indicating on the hour and minute. By generating history information from those types of information, a business model described below can be built as a charging system for the advertisement distribution service.

The advertiser pays the basic rate of the advertising rates to the advertisement distributer according to the history indicating that the advertisement information has been received. The user can be presumed to have watched the advertisement information according to the history indicating that the advertisement information has been displayed. If the history indicating that the advertisement information has been displayed is present, the advertisement distributers charge the advertiser the advertising rates. Further, the user can be presumed to have visited the place shown in the advertisement information from the history indicating that the vehicle C has stopped at the place shown in the advertisement information. Therefore, the advertisement distributers also charge the advertising rates in that case.

The amount of money to be charged may be set lower in the case where many users have received or watched the advertisement information than in the case where a small number of users have received or performed otherwise processing on it.

Returning to FIG. 3, the ETC processing unit 3e exchanges information necessary for payment with the tollgate by 5.8 GHz wireless communications. The necessary information includes information on the vehicle C, as well as the entrance tollgate, the exit tollgate, the toll, and the like, which are read out or written in to or from an IC card which is inserted into the IC card I/F unit 3f by the ETC processing unit 3e.

The IC card I/F unit 3f removably accommodates the IC card on which information specific to the card has been written. The ETC processing unit 3e obtains the information written on the IC card via the IC card I/F unit 3f for the information necessary for use the ETC. Since the histories of toll and the like can be saved on the IC card, the ETC processing unit 3e writes the histories on the IC card via the IC card I/F unit 3f.

The control unit 4 has control over the above-mentioned car navigation unit 1, the VICS module 2, and the DSRC unit 3. For example, the control unit 4 instructs the DSRC control unit 3a to store the destination information, route information, and the like generated by the car navigation unit 1 in the storage unit 3c. When the DSRC unit 3 starts the DSRC connection with the roadside radio device 20, the control unit 4 notifies the car navigation unit 1 of the connection start by sending the connection signal thereto.

Figure 5:
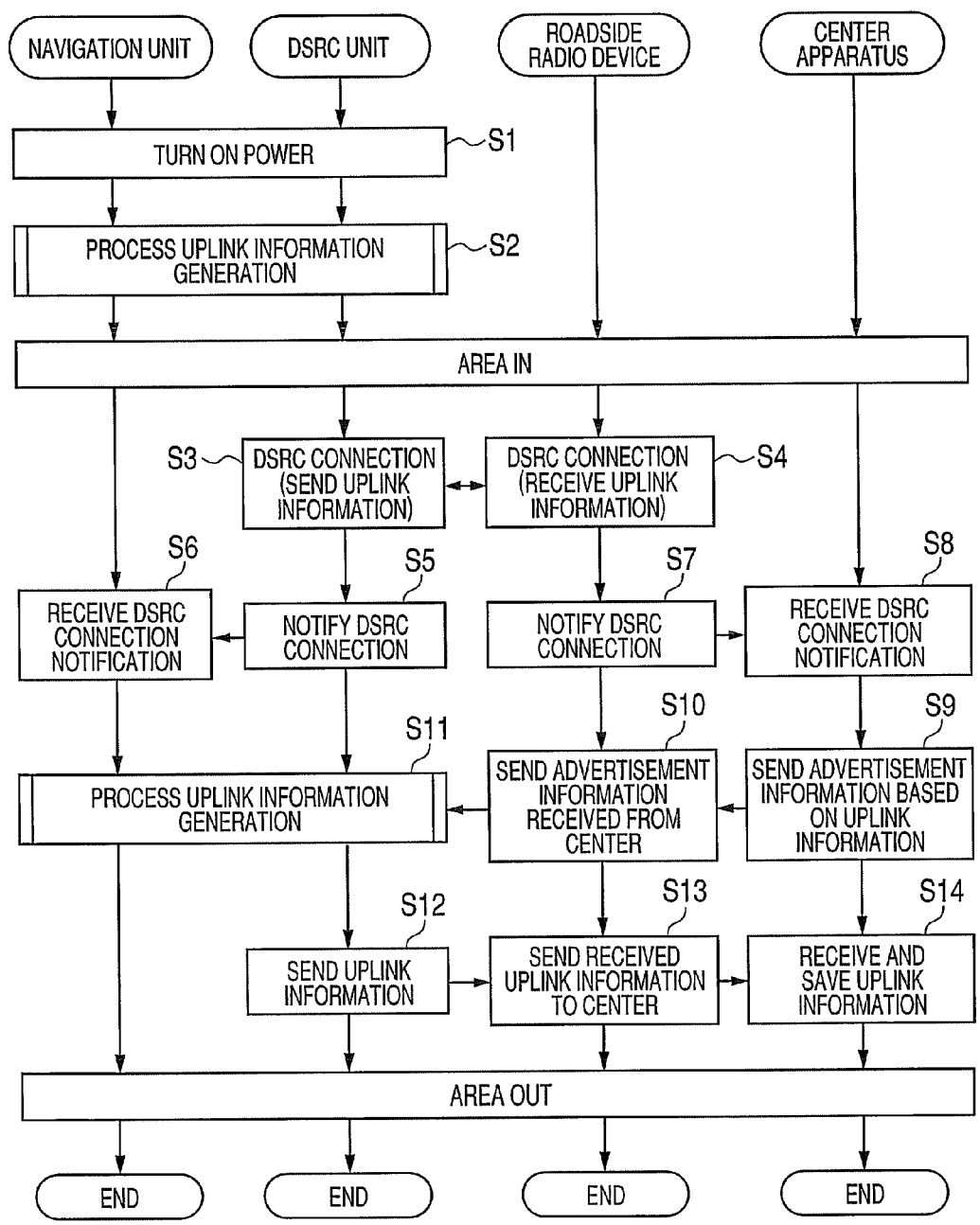
FIG. 5 is a flow chart for describing processing operations of the entire advertisement distribution system.

Now, processing operations of the entire advertisement distribution system will be described with reference to FIG. 5. When the on-vehicle device is turned on power (step S1), the car navigation unit 1 and the DSRC unit 3 perform processing to store the uplink information in the uplink information storage region M (step S2). The uplink information generated here is the past drop place information (see FIG. 4). Other than the information, the control unit 4 generates the types of information (1) to (6) shown in FIG. 4 successively as the information which can be generated even outside the area where the DSRC connection is available, and stores the types of information (1) to (6) to the uplink information storage region M. The information stored is to be saved therein for a certain period as the uplink information.

When the on-vehicle device 10 (the vehicle C) enters the area where it can communicate with the roadside radio device 20, the DSRC unit 13 starts the DSRC connection with the roadside radio device 20. At this time, the uplink information which has been stored in advance by the processing in step S2 is sent to the roadside radio device 20 (step S3), and the roadside radio device 20 receives it (step S4).

The control unit 4 notifies the car navigation unit 1 that the DSRC connection is started (step S5), and the car navigation unit 1 receives it (step S6).

On the other hand, the roadside radio device 20 notifies the center apparatus 30 that the DSRC connection is started, and also sends the uplink information to the center apparatus 30 (step S7).

The center apparatus 30 receives, via the network N, the notification of the DSRC connection and the uplink information which have been sent from the roadside radio device 20 (step S8).

The center apparatus 30 sends the advertisement information which it determined necessary among the advertisement information stored therein to the roadside radio device 20, based on the received uplink information (step S9). The advertisement information sent at this time includes the advertisement information from a plurality of advertisement distributers. The on-vehicle device 10 is to receive only the necessary advertisement information among the advertisement information from the plurality of advertisement distributers. The process in which the on-vehicle device 10 receives only the necessary advertisement information is performed on the basis of the advertisement distributers information which is stored in the uplink information storage region M. This will be described later in the description with reference to FIG. 6.

The roadside radio device 20 receives the advertisement information sent from the center apparatus 30, and distributes the received advertisement information to the on-vehicle device 10 (step S10).

About the distributed advertisement information, the on-vehicle device 10, at first, receives the advertisement distributers information which is included in the advertisement information, and receives only necessary advertisement information among the distributed advertisement information and performs a display processing. At this time, the on-vehicle device 10 performs a generating process on the uplink information about the advertisement information distributed (step S11).

Figure 6:
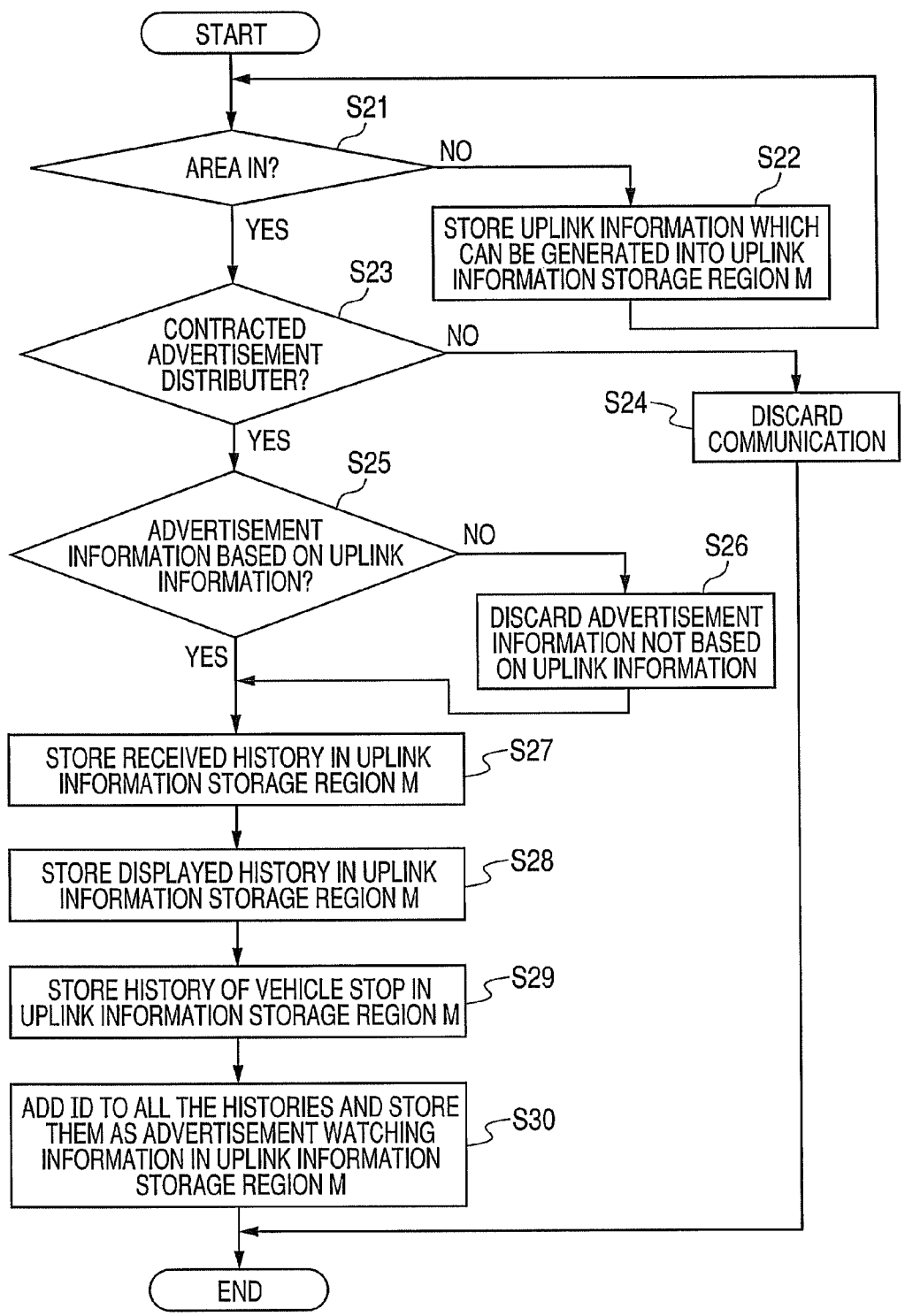
FIG. 6 is a flow chart for describing an uplink information generation processing operation.

FIG. 6 shows the processing operation of the on-vehicle device 10 in the uplink information generation processing operation. Although the control operation to be described below is assumed to be performed by the control unit 4 which has control over the car navigation unit 1, the VICS module 2, and the DSRC unit 3, the control units of respective units may be adapted to control the units.

First, the control unit 4 determines whether it is the area where the DSRC connection is available (step S21). If the DSRC unit 3 does not receive the radio wave sent from the roadside radio device 20 (step S21; NO), the control unit 4 determines that the DSRC connection is not available. Then, it stores the uplink information which can be generated outside the area (see FIG. 4) in the uplink information storage region M (step S22). Since the processing at this time is the same as that in step S2 shown in FIG. 5, the description thereof will be omitted.

If the DSRC unit 3 receives the radio wave sent from the roadside radio device 20 (step S21; YES), the control unit 4 determines that the DSRC connection is available. Then, it is to receive the advertisement information sent from the center apparatus 30 via the roadside radio device 20.

When the DSRC unit 3 is to receive the advertisement information, the control unit 4, at first, determines whether the advertisement information from the advertisement distributer with which the user contracts is distributed (step S23).

The control unit 4 determines whether it is the advertisement information from the contracted advertisement distributer by referring to the advertisement distributers information which has been stored in advance in the uplink information storage region M and identifying the advertisement distributer from the advertisement distributer information included in the received advertisement information.

When the control unit 4 determines that advertisement information from an uncontracted advertisement distributer is included in the received advertisement information (step S23; NO), it discards the advertisement information from the uncontracted advertisement distributer (step S24). Conversely, it receives advertisement information from a contracted advertisement distributer (step S23; YES).

The advertisement information which is distributed by public institutions such as the national government, the local government, and the like is to be treated as advertisement information from a contracted advertisement distributer, thus, the control unit 4 is to receive the advertisement information.

Next, the control unit 4 determines whether the contents of the advertisement information are based on the uplink information (step S25). Specifically, it is assumed that the information on the parking lot around the vehicle C is set to the advertisement information which the user desires to be distributed as (6) the taste genre information shown in FIG. 4, for example. At this time, the control unit 4 determines whether the advertisement information received is the information relating to the parking lot. When the determination is to be made, the control unit 4 refers to the destination information and the like which has been stored in advance in the uplink information storage region M (see (2) to (6) in FIG. 4) and compares those types of information with the corresponding information included in the received advertisement information.

If advertisement information distributed by public institutions has been stored in advance in the uplink information storage region M as taste genre information, that advertisement information can be received without being rejected as spam information.

If advertisement information among the received advertisement information is not based on any one of the (2) to (6) types of uplink information (step S25; NO), the control unit 4 performs the processing to discard the advertisement information (step S26). Accordingly, the user does not need to watch unwanted advertisement information. The advertisement information to be discarded may be limited to the advertisement information which is not based on all the uplink information of the (2) to (6) types of uplink information.

As the result of the processing in steps S25 and S26, the control unit 4 is to receive the advertisement information based on all the uplink information which has been stored in advance (step S25; YES).

When the control unit 4 receives the advertisement information, it generates a history indicating that it has received the advertisement information as the advertisement watching information and stores the advertisement watching information in the uplink information storage region M (step S27). The information which has not been received may also be stored in the uplink information storage region M. Then, the information stored in the uplink information storage region M is to be sent to the center apparatus 30 via the roadside radio device 20 as the uplink information. The roadside radio device 20 may be adapted to send the received information to the center apparatus 30, without requiring the control unit 4 to generate the history indicating that the advertisement information has been received as the advertisement watching information. In that case, the control unit 4 does not need to store the received information in the uplink information storage region M.

If the uplink information includes a history indicating that the advertisement information has been received, the advertisement information is to be a charging object.

When the control unit 4 caused the received advertisement information to be displayed on the display unit 1e, it stores the history indicating that the advertisement information has been displayed in the uplink information storage region M (step S28). It may also store the information which has not been displayed in the uplink information storage region M. Here, the information indicating whether the advertisement information has been displayed includes the hour and minute on which the advertisement information was displayed, the time period during which the advertisement information was displayed, and the like. From the information indicating that the advertisement information has been displayed, the user can be presumed to have watched it. If the uplink information which is sent to the center apparatus 30 includes the history indicating that the advertisement information has been displayed, the advertisement information is to be a charging object. The control unit 4 may also be adapted to store the information which is not displayed in the uplink information storage region M.

If the vehicle C is traveled toward the place which is the advertisement object indicated when the advertisement information is displayed (hereinafter referred to as "advertisement object point") as the destination, the control unit 4 stores the history indicating that vehicle C has stopped before reaching the advertisement object point in the uplink information storage region M (step S29). The control unit 4 may also store the information indicating that it has not stopped in the uplink information storage region M. Here, the history indicating that it has stopped is also the charging object of the advertising rates.

For example, if the vehicle C travels toward the advertisement object point as the destination and stops at the advertisement object point, the user can be presumed to have visited the advertisement object point due to watching the advertising information. Even if the vehicle C has not exactly reached the advertisement object point but has reached around the advertisement object point, the advertisement information may be the charging object by assuming that the user has reached the advertisement object point. That is, the control unit 4 refers to the position information on the advertisement object point which is sent from the center apparatus 30 and the position information to which the vehicle C has actually reached from the map included in the car navigation unit 1 of the on-vehicle device 10. Then, if the two position information match, it is determined the vehicle C has reached there.

That the vehicle C has not reached the advertisement object point may also be generated as the uplink information and stored in the uplink information storage region M.

Based on the history indicating whether the vehicle C has stopped at the advertisement object point, i.e., the information from which the user can be presumed to have visited the advertisement object point or not, the advertiser can recognize the effect of the advertisement and can also pay to the advertisement distributer the advertising rates for the effect.

In order to generate the information indicating that the vehicle C has stopped, the control unit 4 generates the information on the present position of the vehicle C at the time when the on-vehicle device 10 is turned on power. Then, the control unit 4 is to store the information generated at the time of turning on power in the uplink information storage region M as the information indicating that the vehicle C has stopped.

The control unit 4 takes the history or information which was generated by the processing in the above-mentioned steps S27 to S29 as a piece of advertisement watching information, and adds the ID thereto to make the uplink information. Then, the control unit 4 stores the uplink information in the uplink information storage region M (step S30).

Returning to FIG. 5, the control unit 4 sends the uplink information which is generated during the DSRC connection to the roadside radio device 20 (step S12).

The roadside radio device 20 receives the uplink information sent from the on-vehicle device 10 and sends it to the center apparatus 30 (step S13).

The center apparatus 30 receives the uplink information sent from the roadside radio device 20, stores and saves it in a predetermined database (step S14).

When the on-vehicle device 10 moves out of the area in which the DSRC connection with the roadside radio device 20 is available, the DSRC connection between the on-vehicle device 10 and the roadside radio device 20 is interrupted and the present processing ends.

Now, an example of screen transition after the on-vehicle device 10 received the advertisement information until the received advertisement information is displayed on the display unit 1e will be described with reference to FIG. 7. The screens D1 to D5 illustrate the screens which transition based on the information the user has input through the input unit 1d, and finally the screen D6 displays the advertisement information.

Figure 7:
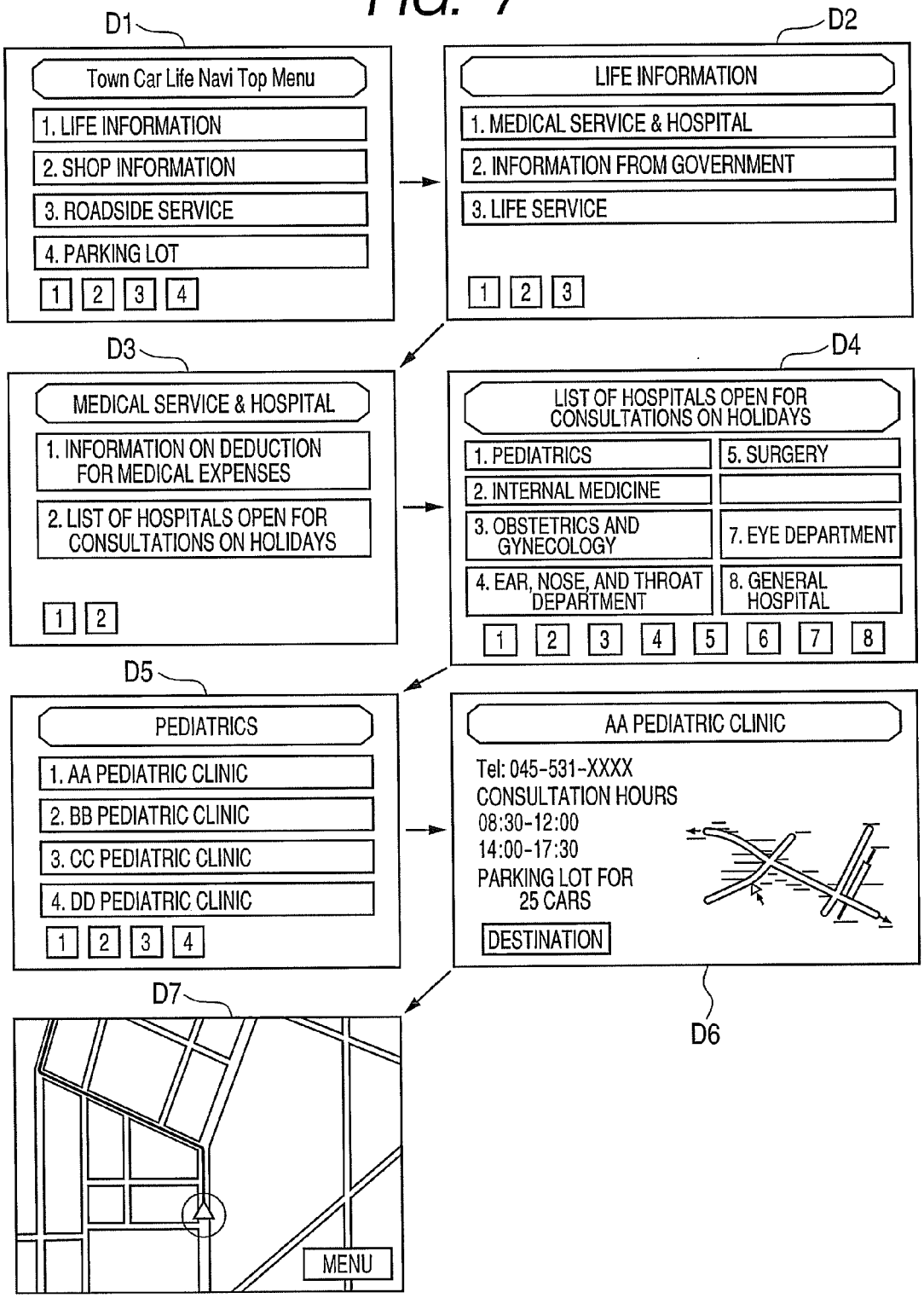
FIG. 7 shows exemplary screens for describing screen transition with respect to advertisement information.

The screens shown in FIG. 7 is in a nest (tree) structure, which enables the user to change the screens which can be selected for each category from a large group to a small group (D1 to D6) according to selection by the user. The changing of the screens will be specifically described below.

First, the control unit 4 causes the display unit 1e to display the selection screen for selecting the category of the advertisement information (D1). On the screen displayed here, the user can select a large group and can roughly select the advertisement information which the user desires to watch. For example, if the user selects the advertisement information about LIFE INFORMATION through the input unit 1d, the control unit 4 causes the screen on which further detailed items are available to be displayed about the advertisement information of LIFE INFORMATION (D2).

When MEDICAL SERVICE & HOSPITAL is selected, the control unit 4 causes the information on MEDICAL SERVICE & HOSPITAL or a hospital list to be displayed on the screen (D3). If the list is selected, the control unit 4 causes the screen about LIST OF HOSPITALS WHICH OPEN FOR CONSULTATIONS ON HOLIDAYS (D4), and causes the list screen of hospitals which has PEDIATRICS (D5) to be displayed.

The control unit 4 causes the display unit 1e to display the hospital which is finally selected by the user. At this time, the control unit 4 generates the history indicating that the advertisement information has been displayed. Then, the control unit 4 stores the generated history in the uplink information storage region M.

Also, the screen displayed at the time when the vehicle C is travelling toward the destination of the advertisement object point shown in the screen (D6) which displays the advertisement information, is shown on the screen D7.

The control unit 4 generates the history indicating that the vehicle C has stopped before reaching the advertisement object point, and stores the generated information in the uplink information storage region M.

As mentioned above, according to the embodiment, the user can receive and watch the advertisement information based on the uplink information. Then, the user can make the advertisement object point shown in the watched advertisement information as the destination. Accordingly, the user will not receive unwanted advertisement information. Since the user neither watches such advertisement information, the time for obtaining the necessary advertisement information can be reduced. That can improve the convenience of the user on the on-vehicle device 10.

On the other hand, the advertiser can distribute the advertisement information by focusing on the users who are the target of the advertisement, as mentioned above. The advertiser can charge in accordance with use, for the time when the user receives the advertisement information, the time when the user displays the advertisement information, and the time when the user visits the advertisement object point. Accordingly, the advertiser can pay appropriate advertising rates to the advertisement distributer and can receive the advertisement distribution service which enables the advertiser to clearly recognize the cost-effectiveness of the advertisement.

The invention claimed is:

1. An on-vehicle device comprising:
    a communication unit, connected to a roadside radio device, adapted to communicate with a center apparatus which distributes a plurality of advertisement information via the roadside radio device;
    a display unit adapted to display the distributed advertisement information;
    a storage unit adapted to store uplink information which includes identification information for identifying each contracted advertisement distributer of advertisement information and taste genre information for each identification information for identifying the contracted advertisement distributer; and
    a control unit adapted to operate to
        determine based on the identification information whether or not, from among the plurality of advertisement information distributed from the center apparatus, there is the advertisement information from the contracted advertisement distributer,
        discard the advertisement information from the not-contracted advertisement distributer,
        in a case where it is determined that there is the advertisement information from the contracted advertisement distributer, further determine whether or not the advertisement information from the contracted advertisement distributer is the advertisement information based on the uplink information,
        in a case where it is determined that the advertisement information from the contracted advertisement distributer is not the advertisement information based on the uplink information, discard the advertisement information, and
        in a case where it is determined that the advertisement information from the contracted advertisement distributer is the advertisement information based on the uplink information, generate send information including at least one or all of a history indicating that the advertisement information has been received, a history indicating that the advertisement information has been displayed, and a history indicating that an own vehicle has reached a position indicated by the advertisement information, and accumulate the generated send information as the uplink information.

2. The on-vehicle device according to claim 1, wherein the control unit operates to cause the communication unit to send the uplink information stored by the storage unit to the center apparatus.

3. The on-vehicle device according to claim 1, wherein the control unit operates to generate information on traveling of the own vehicle as the uplink information.

4. The on-vehicle device according to claim 1, further comprising an input unit adapted to input a content of the advertisement information which is desired to be received,
    wherein the control unit operates to generate information on the advertisement information which is input by the input unit and desired to be received, and to include the generated information in the uplink information.

5. The on-vehicle device according to claim 1, wherein the control unit operates to store the received advertisement information in the storage unit for each category based on the uplink information, and to cause the display unit to display the stored advertisement information for each category.

6. An advertisement information distribution system which enables an advertising rate to be charged in accordance with a use situation of advertisement information by a user, the system comprising:
    a center apparatus adapted to distribute a plurality of advertisement information;
    a roadside radio device adapted to communicate with the center apparatus; and
    an on-vehicle device, connected to the roadside radio device, adapted to receive the advertisement information via the roadside radio device,
    wherein the on-vehicle device comprises
        a display unit adapted to display the distributed advertisement information,
        a storage unit adapted to store uplink information which includes identification information for identifying each contracted advertisement distributer of advertisement information and taste genre information for each identification information for identifying the contracted advertisement distributer, and
        a control unit adapted to operate to
            determine based on the identification information whether or not, from among the plurality of advertisement information distributed from the center apparatus, there is the advertisement information from the contracted advertisement distributer,
            discard the advertisement information from the not-contracted advertisement distributer,
            in a case where it is determined that there is the advertisement information from the contracted advertisement distributer, further determine whether or not the advertisement information from the contracted advertisement distributer is the advertisement information based on the uplink information,
            in a case where it is determined that the advertisement information from the contracted advertisement distributer is not the advertisement information based on the uplink information, discard the advertisement information, and
            in a case where it is determined that the advertisement information from the contracted advertisement distributer is the advertisement information based on the uplink information, generate send information including at least one or all of a history indicating that the advertisement information has been received, a history indicating that the advertisement information has been displayed, and a history indicating that an own vehicle has reached a position indicated by the advertisement information, and accumulate the generated send information as the uplink information.

* * * * *